United States Patent
Krishnan et al.

(10) Patent No.: US 9,071,926 B2
(45) Date of Patent: Jun. 30, 2015

(54) DEVICE DETECTION USING LOAD MODULATION IN NEAR-FIELD COMMUNICATIONS

(71) Applicant: Qualcomm Incorporated, San Diego, CA (US)

(72) Inventors: Koushik Krishnan, San Jose, CA (US); Rainer Gaethke, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 13/657,751

(22) Filed: Oct. 22, 2012

(65) Prior Publication Data
US 2014/0113551 A1    Apr. 24, 2014

(51) Int. Cl.
| | |
|---|---|
| H04W 4/00 | (2009.01) |
| G06K 7/10 | (2006.01) |
| H04B 5/00 | (2006.01) |
| H04B 5/02 | (2006.01) |
| H04M 1/725 | (2006.01) |

(52) U.S. Cl.
CPC ........... *H04W 4/008* (2013.01); *G06K 7/10128* (2013.01); *H04B 5/0031* (2013.01); *H04B 5/0075* (2013.01); *H04B 5/02* (2013.01); *G06K 7/10237* (2013.01); *H04M 1/7253* (2013.01); *H04M 2250/04* (2013.01)

(58) Field of Classification Search
None
See application file for complete search history.

(56) References Cited

U.S. PATENT DOCUMENTS

| | | | |
|---|---|---|---|
| 7,734,307 | B2 | 6/2010 | Dawidowsky |
| 7,899,393 | B2 | 3/2011 | Luong |
| 2003/0003870 | A1* | 1/2003 | Cernusca et al. ............... 455/41 |
| 2006/0145853 | A1 | 7/2006 | Richards et al. |
| 2007/0265033 | A1* | 11/2007 | Brostrom ..................... 455/557 |
| 2009/0086702 | A1 | 4/2009 | Julian et al. |
| 2010/0009627 | A1 | 1/2010 | Huomo |
| 2010/0027452 | A1 | 2/2010 | Skinner et al. |
| 2012/0045989 | A1* | 2/2012 | Suumaki et al. ............. 455/41.1 |
| 2012/0329405 | A1* | 12/2012 | Lee et al. ........................ 455/73 |

FOREIGN PATENT DOCUMENTS

| | | |
|---|---|---|
| EP | 2221984 A1 | 8/2010 |
| WO | WO-2008050085 A1 | 5/2008 |

OTHER PUBLICATIONS

Jonathan Collins, New System's Tags Talk First and Fast, Dec. 15, 2005, RFID Journal, pp. 1-2.*
ECMA International: "Near Field Communication Interface and Protocol (NFCIP-1)", Standard ECMA, vol. ECMA 340, Dec. 1, 2004.
International Search Report and Written Opinion—PCT/US2013/059951—ISA/EPO—Jan. 8, 2014.

* cited by examiner

*Primary Examiner* — Alejandro Rivero
(74) *Attorney, Agent, or Firm* — Mahamedi Paradice LLP

(57) ABSTRACT

First and second NFC devices both seek to determine whether the other device is present and available for communication across an NFC channel. The first NFC device modulates a load in its transceiver. The second NFC device transmits a waveform. If the first NFC device detects the waveform while modulating its load, and if the second NFC device detects the load modulation while transmitting the waveform, then the two NFC devices initiate communication in accordance with a communication protocol.

30 Claims, 5 Drawing Sheets

DEVICE DETECTION USING LOAD MODULATION IN NEAR-FIELD COMMUNICATIONS

TECHNICAL FIELD

The present embodiments relate generally to near-field communications (NFC), and specifically to detecting the presence of an NFC device.

BACKGROUND OF RELATED ART

NFC technology allows for communications between a mobile device (e.g., an NFC-enabled mobile phone or smart card) and an NFC reader (e.g., in a point-of-sale terminal, admissions gate, or another mobile device) over a distance of several centimeters or less. To initiate communications, an NFC device first recognizes that another NFC device is within range. Techniques that involve periodic polling consume excessive amounts of power and may be too elaborate to be performed frequently. Accordingly, there is a need for efficient techniques for an NFC device to detect the presence of another NFC device.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

Figure 1:
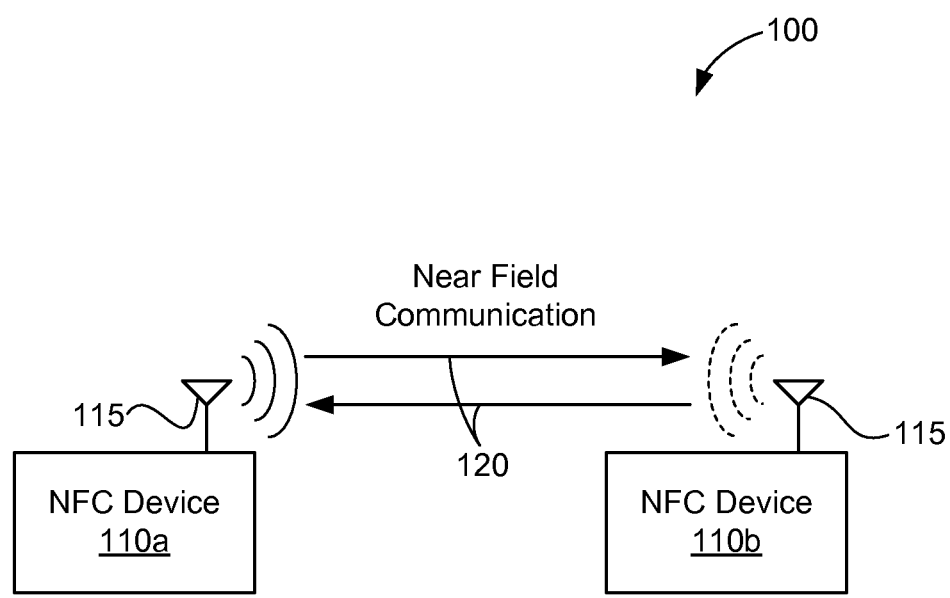
FIG. 1 is a block diagram of an NFC system that includes two NFC-enabled communication devices in accordance with some embodiments.

Embodiments are disclosed in which a near-field communications (NFC) device modulates a load in its transceiver to signal its presence to other NFC devices while leaving the NFC channel idle and thus available for signal transmission by another NFC device.

In some embodiments, a first NFC device modulates a load in its transceiver. While modulating the load, the first NFC device detects a waveform transmitted on an NFC channel by a second NFC device. In response to detecting the waveform while modulating the load, the first NFC device communicates with the second NFC device over the NFC channel.

In some embodiments, a first NFC device transmits a waveform on an NFC channel. While transmitting the waveform, the first NFC device detects modulation of a load in a second NFC device. In response to detecting the modulation of the load in the second NFC device while transmitting the waveform, the first NFC device communicates with the second NFC device over the NFC channel.

In some embodiments, an NFC device includes an NFC antenna, a transmitter to modulate a load coupled to the NFC antenna, and a receiver to receive a waveform from another NFC device via the NFC antenna. The NFC device also includes a controller to initiate a first portion of a protocol for communicating with the other NFC device in response to the receiver receiving the waveform while the transmitter modulates the load. Furthermore, the transmitter may modulate the load during a first mode and transmit a waveform during a second mode, and the receiver may include a field detector module to detect the presence of a waveform transmitted by the other device and a second receiver module to detect load modulation by the other NFC device. The controller initiates a second portion of the protocol in response to the receiver detecting the load modulation by the other NFC device while the transmitter transmits the waveform.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

FIG. 1 shows an NFC system 100 that includes two NFC-enabled communication devices 110a and 110b in accordance with some embodiments. NFC devices 110a and 110b are each equipped with an NFC antenna 115 capable of exchanging wireless communication signals in the near field with other NFC antennas in other NFC devices. When the antennas 115 of the NFC devices 110a and 110b are brought near to each other (e.g., within a few centimeters of each other—for example, within four centimeters of each other), they become inductively coupled; once inductively coupled, they allow the NFC devices 110a and 110b to perform near-field communication with each other over an NFC channel 120. This inductive coupling may be measured using the well-known inductive coupling K-factor; the two antennas 115 are considered to be inductively coupled to a degree sufficient for near-field communication if K satisfies a threshold (e.g., if K is at least 0.05). In some embodiments, the antennas 115 are loop antennas that allow for radio frequency (RF) transmission and reception, although other well-known antennas can be used. In some embodiments, near-field communication between the NFC devices 110a and 110b is performed in accordance with one or more standards (e.g., ISO/IEC 18092, ECMA-340, and/or standards defined by the NFC Forum).

In some embodiments, both NFC devices 110a and 110b are mobile electronic devices (e.g., cellular phones, personal digital assistants, or other mobile devices). In other embodiments, the NFC device 110a is an NFC reader situated, for example, in a kiosk or admissions gate, and the NFC device 110b is a mobile device. In some embodiments, the NFC device 110a is a proximity coupling device (PCD) and the NFC device 110b is a proximity integrated circuit card (PICC).

Figure 2:
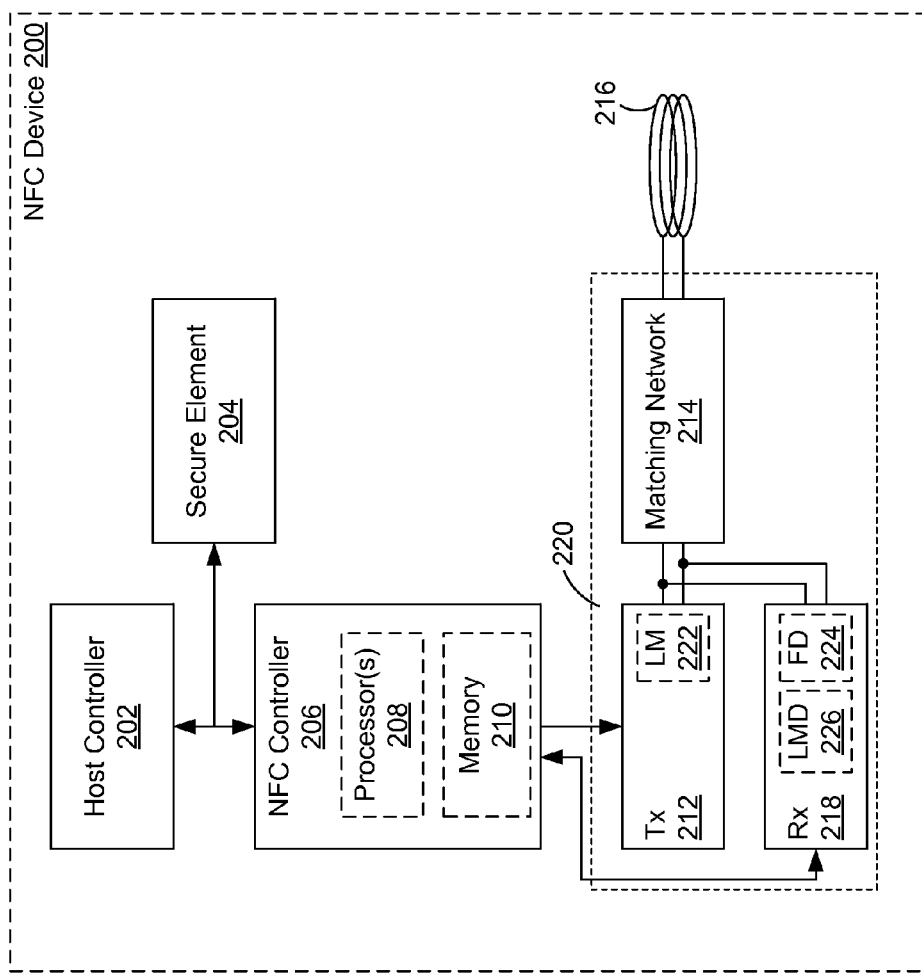
FIG. 2 is a block diagram of an NFC device in accordance with some embodiments.

FIG. 2 is a block diagram of an NFC device 200 in accordance with some embodiments. The NFC device 200 is an example of a mobile device 110a or 110b (FIG. 1), such as an NFC-enabled mobile device or NFC reader.

The NFC device 200 has an NFC controller 206, which includes one or more processors (or processor cores) 208 and memory 210. The memory 210 includes instructions that, when executed by the one or more processors 208, cause the NFC controller 206 to implement an NFC protocol (e.g., as specified in standards such as ISO/IEC 18092, ECMA-340, and/or standards defined by the NFC Forum). In some embodiments, these instructions are stored in a non-transitory computer-readable medium (e.g., one or more non-volatile memory devices) in the memory 210.

The NFC controller 206 is coupled to and controls a transceiver 220, which includes a transmitter 212 and a receiver 218. The transmitter 212 and receiver 218 are coupled to an NFC antenna 216 (shown in FIG. 2 as a loop antenna that acts as an inductor) through a matching network 214, which may also be considered part of the transceiver 220. The antenna 216 is an example of an antenna 115 (FIG. 1). During communication with another NFC device (e.g., another device 200), the NFC controller 206 provides data to the transmitter 212, which encodes the data and provides a corresponding signal to the matching network 214 and antenna 216. In some embodiments, this signal includes a carrier signal with a radio-frequency (RF) carrier frequency. In one example, the carrier frequency is 13.56 MHz. The receiver 218 demodulates a near-field signal received from the other NFC device via the antenna 216 and matching network 214 and provides the corresponding data to the NFC controller 206. The matching network 214 and antenna 216 compose a resonant circuit, also referred to as a tank circuit, which may be resonated by a signal applied to it from the transmitter 212 or received in the near field from the other NFC device.

The transmitter 212 includes a load modulation (LM) module 222 to modulate a load (e.g., a resistor) coupled to the antenna 216. This load may be situated, for example, in the transmitter 212 or in the matching network 214. In some embodiments, the load modulation module 222 modulates the load in a repetitive manner during a specified period of time. Load modulation may be detected by another NFC device (e.g., another device 200) whose antenna is inductively coupled to the antenna 216. Load modulation does not, however, create noise on the NFC channel 120 (FIG. 1) that would cause another NEC device to think that that the channel 120 is in use. Other NFC devices are thus free to transmit on the channel 120 while the load modulation module 222 performs load modulation. Load modulation consumes a negligible amount of power, and thus provides a low-power technique that allows the NFC device 200 to signal its presence to other NFC devices. The receiver 218 includes a field detector (FD) module 224 to detect the presence of a waveform (e.g., a continuous waveform) being transmitted by another NFC device and a load modulation detector (LMD) 226 to detect load modulation by another NFC device (e.g., by a load modulation module 222 in another NFC device).

Figure 3:
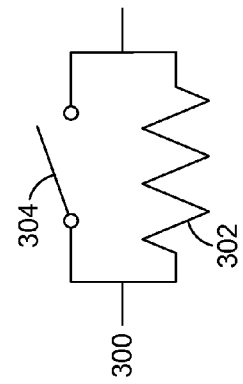
FIG. 3 is a circuit diagram of a switchable resistor used to perform load modulation in accordance with some embodiments.

In some embodiments, the load to be modulated includes a resistor 302 that may be switched in and out of a signal path 300 in the transmitter 212 or matching network 214, as shown in FIG. 3 in accordance with some embodiments. For example, the resistor 302 is situated in parallel with a switch 304. When the switch 304 is closed, the signal path 300 effectively bypasses the resistor 302. When the switch 304 is opened, the resistor 302 is included in the signal path 300. The switch may be opened and closed repetitively (e.g., in accordance with a control signal from the load modulation module 222) when performing load modulation, thus toggling the load.

The NFC device 200 may also include a host controller 202 to execute one or more applications, which may involve near-field communications. The NFC device 200 may further include a secure element 204 to store NFC data. In additional, the NFC device 200 may include other components not shown in FIG. 2. For example, the NFC device 200 may include one or more other antennas (e.g., for cellular communications or communications using a wireless local area network such as WiFi) and corresponding controllers.

The NFC device 200 may operate in a number of different modes, including idle channel listen mode, sleep mode, continuous waveform (CW) mode, whisper mode, data transmit mode, and data receive mode. In the idle channel listen mode, the receiver 218 (e.g., the field detector 224) is activated to sense whether there is activity on the NFC channel. If the channel is silent and thus idle, the transmitter 212 may subsequently transmit. For example, the device 200 subsequently enters CW mode or data transmit mode. If the channel is not silent and thus not available to transmit over, the device 200 enters sleep mode. For example, the device 200 (or NFC controller 206) goes to sleep for a period of time specified by a random back-off timer. The NFC device 200 thereby implements a Carrier Sense Multiple Access (CSMA) protocol. In CW mode, the transmitter 212 transmits a continuous waveform (e.g., an oscillating signal) and the receiver 218 (e.g., the load modulation detector 226) is activated to detect whether another device within range is performing load modulation (e.g., is in whisper mode). In whisper mode, the load modulator 222 performs load modulation (e.g., repetitive load modulation) and the receiver 218 (e.g., the field detector 224) is activated to determine whether another device within range is transmitting a continuous waveform. In the data transmit mode, the device 200 activates the transmitter 212 and transmits a packet to another device determined to be within range. In the data receive mode, the device 200 activates the receiver 218 to receive a packet from the device determined to be within range. In some embodiments, the NFC controller 206 transitions between modes and performs the functions of respective modes based on instructions stored in the memory 210 (e.g., in a non-transitory computer-readable medium in the memory 210) and executed by the one or more processors 208.

Figure 4:
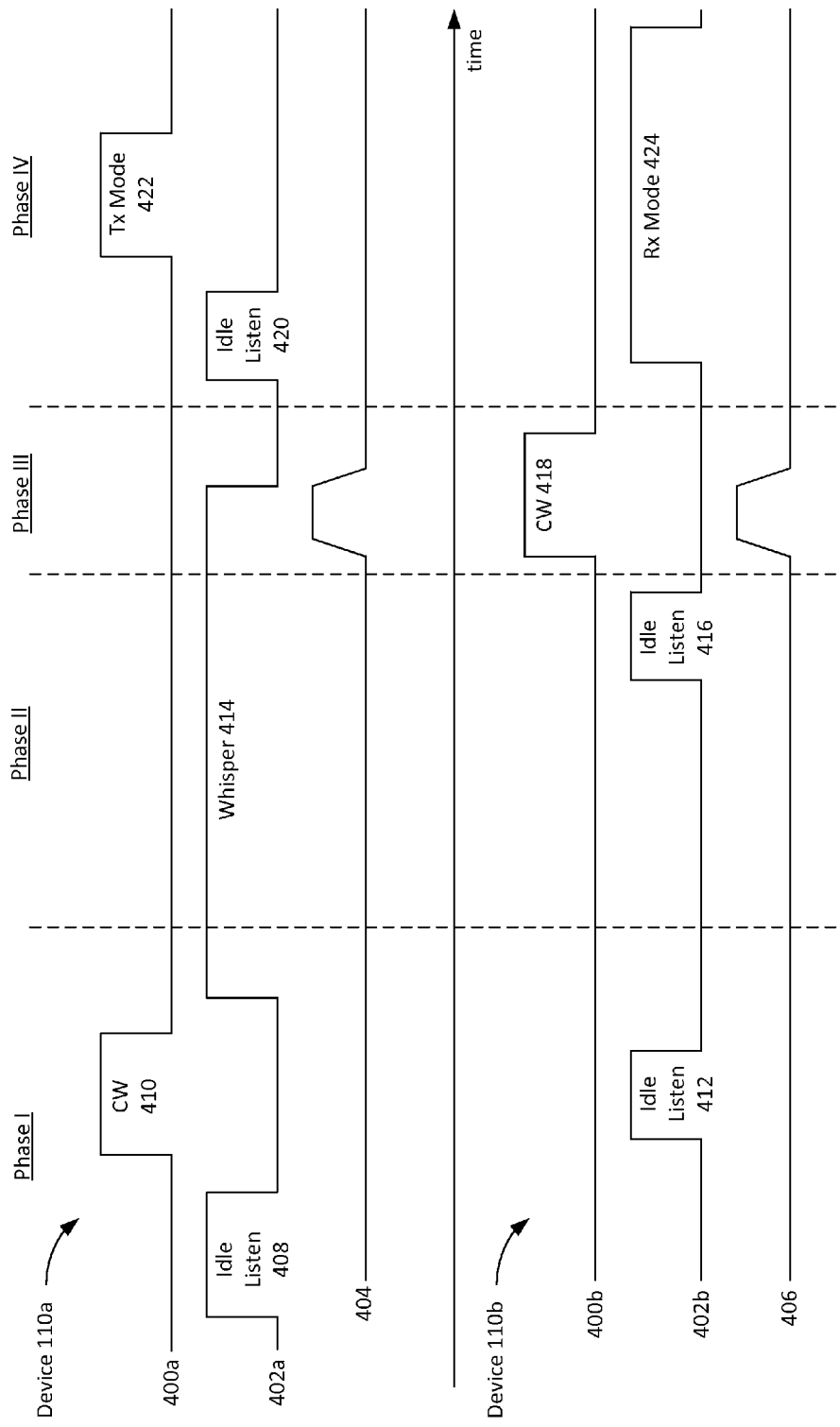
FIG. 4 is a timeline illustrating an NFC detection process in accordance with some embodiments.

FIG. 4 is a timeline illustrating an NFC detection process in accordance with some embodiments. In the detection process of FIG. 4, a first device 110a (FIG. 1) transitions between various modes as specified by mode control signals 400a, 402a, and 404, and a second device 110b (FIG. 1) transitions between various modes as specified by mode control signals 400b, 402b, and 406. The detection process is divided into four phases. In Phase I, the first device 110a enters idle listen mode 408 and listens to the NFC channel 120 (FIG. 1) to determine whether the channel is idle or whether another device is transmitting on the channel. The first device 110a determines that the channel 120 is idle and, in response, enters CW mode 410 and transmits a continuous waveform. If the second device 110b were performing load modulation while the first device 110a is in CW mode 410, the first device 110a would detect the modulation (e.g., using the load modulation detector 226, FIG. 2). In this example, however, the second device 110b does not perform load modulation during Phase I. Instead, the second device 110b performs an idle listen operation 412, determines that another device (first device 110a) is transmitting on the channel 120 and that the channel therefore is not idle, and in response to this determination does not enter CW mode. Instead, the second device 110b goes to sleep (e.g., for a period of time specified by a random back-off timer).

At the end of Phase I, the first device 110a completes CW transmission 410 and then enters a whisper mode 414, in which it performs load modulation. The first device 110a stays in whisper mode and continues to perform load modulation throughout Phase II.

At the end of Phase II, the second device 110b wakes up and performs another idle listen operation 416. This time, the second device 110b determines that the channel is idle: the load modulation performed by the first device 110a during whisper mode 414 does not amount to a transmission that the second device 110b would detect during the idle listen operation 416. In response to determining that the channel is idle, the second device 110b enters CW mode 418 at the beginning of Phase III. Transmission of a continuous waveform by the second device 110b during the CW mode 418 overlaps with whisper-mode 414 load modulation by the first device 110a. While still in whisper mode 414, the first device 110a detects the coupling of energy from the continuous waveform into its receiver 218 (FIG. 2), and the second device 110b detects the load modulation performed by the first device 110a. For example, the second device 110b measures the voltage $V_{j2}$ (as defined by the NFC Forum) and determines that $V_{j2}$ satisfies (e.g., is greater than, or greater than or equal to) a threshold (e.g., 20 mV). This voltage threshold corresponds to an inductive coupling threshold (e.g., inductive coupling factor K>0.05), above which the second device 110b assumes that another device (the first device 110a) is inductively coupled to it.

These simultaneous acts of detection in the two devices 110a and 110b result in the assertion of respective detection signals 404 and 406 in the two devices. In response to assertion of the signals 404 and 406, the two devices 110a and 110b implement a protocol to initiate communications between each other. For example, in Phase IV the first device 110a performs an idle listen operation 420, determines that the channel is idle, and enters data transmit mode 422, in which it transmits a packet to the second device 110b. The first device 110a thus implements a first portion of the protocol. The second device 110b enters data receive (Rx) mode 424 to receive the packet, and thus implements a second portion of the protocol. The second device 110b may subsequently send packets to the first device 110a in accordance with the protocol. (Alternatively, the operations performed by the devices 110a and 110b in Phase IV may be reversed.)

Figure 5A:
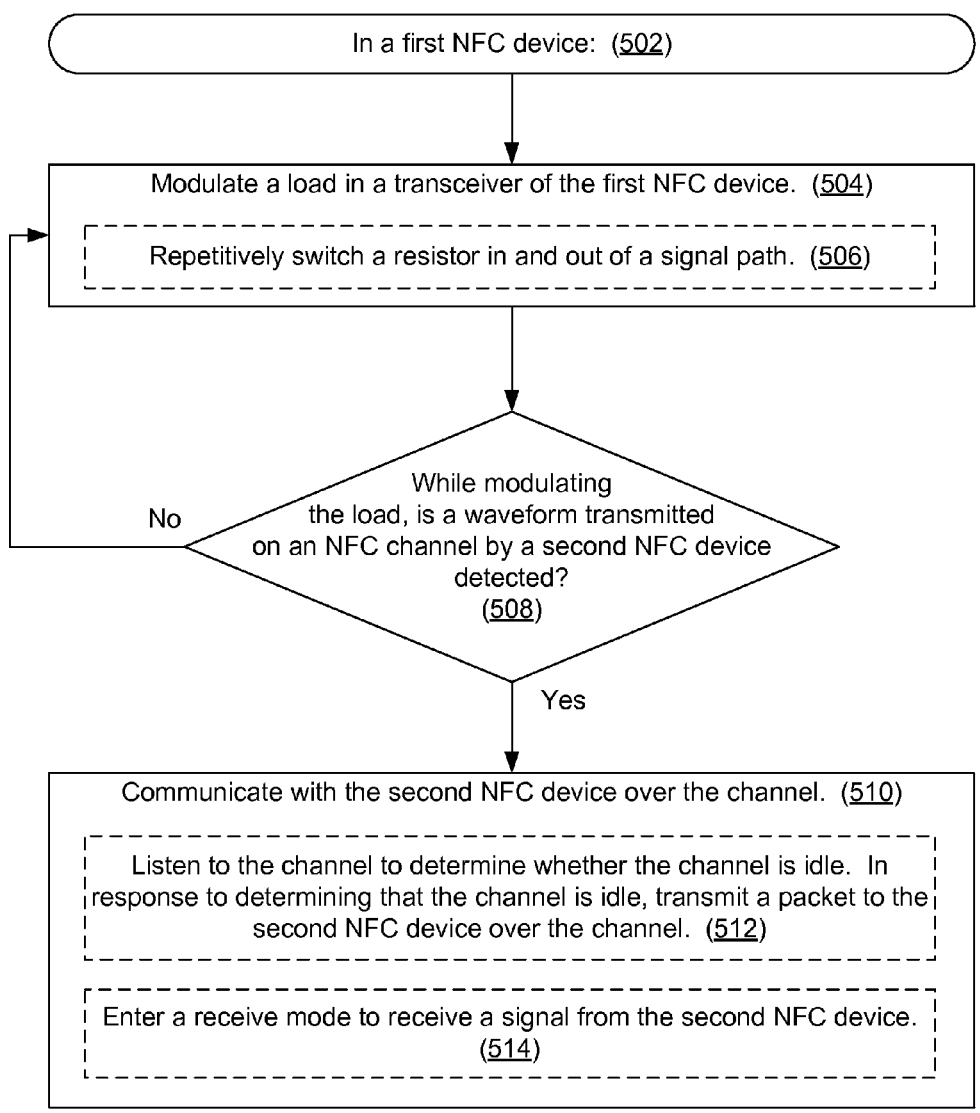
FIGS. 5A and 5B are flowcharts illustrating methods of establishing communications between NFC devices in accordance with some embodiments.

FIG. 5A is a flowchart illustrating a method 500 of establishing communications between NFC devices in accordance with some embodiments. The method 500 is performed (502) by a first NFC device (e.g., device 110a, FIGS. 1 and 4). In some embodiments, the memory 210 (e.g., a non-transitory computer-readable medium in the memory 210) of the NFC device 200 (FIG. 2) stores instructions that, when executed by the one or more processors 208, cause the NFC device 200 to perform all or a portion of the method 500.

The first NFC device modulates (504) a load in its transceiver 220 (FIG. 2). In some embodiments, the load is modulated repetitively by the load modulation module 222 (FIG. 2) during whisper mode 414 (FIG. 4). For example, a resistor 302 (FIG. 3) is repetitively switched (506) in and out of a signal path 300.

While modulating the load, a determination is made (508) as to whether a waveform (e.g., the continuous waveform of CW mode 418, FIG. 4, which may be an oscillating signal) is being transmitted on an NFC channel 120 (FIG. 1) by a second NFC device (e.g., device 110b, FIGS. 1 and 4). If the receiver 218 (FIG. 2) (e.g., the field detector 224) of the first NFC device detects the waveform (508—Yes) while the load is being modulated, then the first NFC device proceeds to communicate (510) with the second NFC device over the channel 120. In some embodiments, the first NFC device implements a portion of a communications protocol in response to detecting the waveform while modulating the load. For example, the first NFC device listens (512) to the channel 120 to determine whether the channel is idle (e.g., performs idle listen 420, FIG. 4). In response to determining that the channel is idle, the NFC device transmits (512) a packet to the second NFC device over the channel 120 (e.g., during data transmit mode 422, FIG. 4). In another example, the first NFC device enters (514) a receive mode to receive a signal from the second NFC device.

If the receiver 218 (FIG. 2) (e.g., the field detector 224) of the first NFC device does not detect the waveform (508—No) while the load is being modulated, then the method 500 returns to the load modulation operation 504. Alternatively, the first NFC device may perform other operations before or instead of returning to the load modulation operation 504. For example, the device may go to sleep, perform an idle listen operation 408 (FIG. 4), and/or enter CW mode 410 (FIG. 4).

Figure 5B:
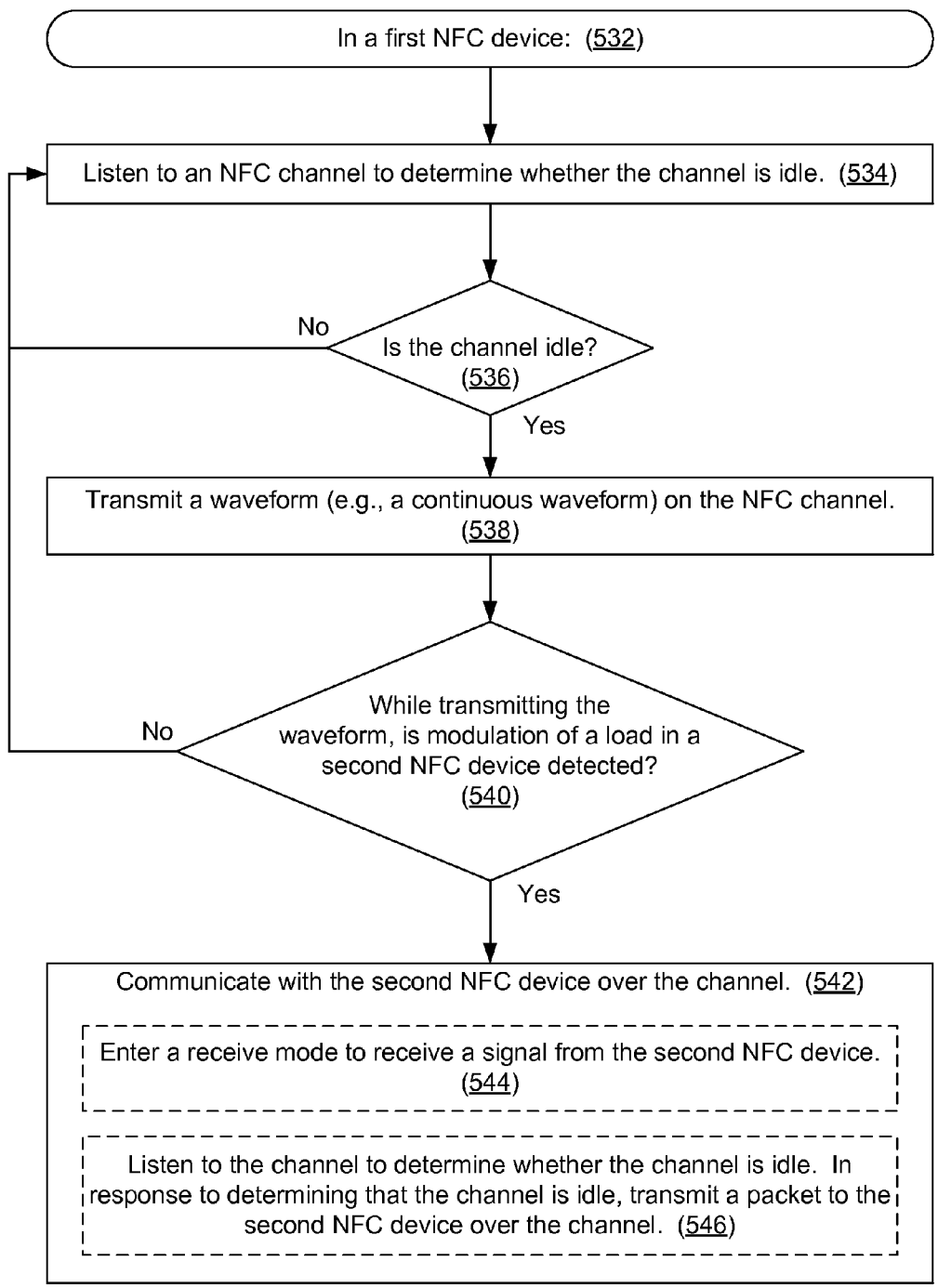

FIG. 5B is a flowchart illustrating a method 530 of establishing communications between NFC devices in accordance with some embodiments. The method 530 is performed (532) by a first NFC device (e.g., device 110b, FIGS. 1 and 4). (The first NFC device of the method 530 is thus an example of the second device described in the context of FIG. 4.) In some embodiments, the methods 500 and 530 are performed in conjunction with each other: one device performs the method 500 while another performs the method 530 (e.g., as shown in FIG. 4). In some embodiments, the memory 210 (e.g., a non-transitory computer-readable medium in the memory 210) of the NFC device 200 stores instructions that, when executed by the one or more processors 208, cause the NFC device 200 (FIG. 2) to perform all or a portion of the method 530.

The first NFC device listens (534) to an NFC channel 120 (FIG. 1) to determine whether the channel is idle. For example, the first NFC device performs idle listen operation 412 or 416 (FIG. 4). If the channel is determined to be in use (536—No), the method 530 returns to the idle listen operation 534. Alternatively, the first NFC device performs one or more other operations (e.g., goes to sleep) before or instead of returning to the idle listen operation 534.

If the channel is determined to be idle (536—Yes), however, then the first NFC device transmits (538) a waveform (e.g., a continuous waveform, such as an oscillating signal) on the NFC channel 120. For example, the waveform is transmitted during CW mode 418 (FIG. 4).

While transmitting the waveform, a determination is made (540) as to whether modulation of a load (e.g., repetitive variation of the load) in a second NFC device is detected. For example, the NFC controller 206 (FIG. 2) uses the load modulation detection module 226 (FIG. 2) to make this determination. In some embodiments, making this determination includes determining whether a predefined voltage satisfies a threshold (e.g., whether $V_{j2}$ is greater than, or is greater than or equal to, a threshold).

If no load modulation is detected while transmitting the waveform (540—No), the method 530 returns to the idle listen operation 534. Alternatively, the first NFC device performs one or more other operations (e.g., goes to sleep) before or instead of returning to the idle listen operation 534.

If load modulation in the second NFC device is detected while transmitting the waveform (540—Yes), however, then the first NFC device proceeds to communicate (542) with the second NFC device over the channel 120. In some embodiments, the first NFC device implements a portion of a communications protocol in response to detecting the load modulation while transmitting the waveform. For example, the first NFC device enters (544) receive mode 424 (FIG. 4) to receive a packet from the second NFC device over the channel 120. In another example, the first NFC device listens to the channel 120 to determine whether the channel is idle and, in response to determining that the channel is idle, transmits a packet to the second NFC device over the channel 120 (546).

Because load modulation consumes negligible current, the methods 500 and 530 provide efficient, low-power techniques for establishing communications between NFC devices. For battery-powered NFC devices, the methods 500 and 530 extend battery life.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of establishing communications between near-field communications (NFC) devices, the method comprising:
    at a first NFC device:
        first, modulating a load in a transceiver of the first NFC device to signal its presence to other NFC devices without using a carrier signal;
        then, while still modulating the load, detecting a waveform transmitted on an NFC channel by a second NFC device; and
        in response to detecting the waveform while modulating the load, communicating with the second NFC device over the channel.

2. The method of claim 1, wherein modulating the load comprises repetitively varying the load.

3. The method of claim 2, wherein:
    the load comprises a resistor in a transmitter of the first NFC device; and
    repetitively varying the load comprises repetitively switching the resistor in and out of a signal path.

4. The method of claim 1, wherein detecting the waveform comprises detecting an oscillating signal.

5. The method of claim 1, wherein communicating with the second NFC device comprises:
    listening to the channel to determine whether the channel is idle;
    determining that the channel is idle; and
    in response to determining that the channel is idle, transmitting a packet to the second NFC device over the channel.

6. The method of claim 1, wherein communicating with the second NFC device comprises entering a receive mode to receive a signal from the second NFC device.

7. The method of claim 1, wherein the load is modulated during a whisper mode.

8. A method of establishing communications between near-field communications (NFC) devices, the method comprising:
    at a first NFC device:
        first, transmitting a waveform on an NFC channel;
        then, while still transmitting the waveform, detecting a presence of a second NFC device by detecting modulation of a load in the second NFC device, the load modulation independent of the waveform and independent of a carrier signal; and
        in response to detecting the load modulation while transmitting the waveform, communicating with the second NFC device over the channel.

9. The method of claim 8, further comprising:
    prior to transmitting the waveform on the channel:
        listening to the channel to determine whether the channel is idle, and
        determining that the channel is idle;
    wherein the waveform is transmitted on the channel in response to determining that the channel is idle.

10. The method of claim 8, wherein transmitting the waveform comprises transmitting an oscillating signal.

11. The method of claim 8, wherein detecting modulation of the load comprises detecting repetitive variation of the load.

12. The method of claim 8, wherein detecting modulation of the load comprises determining that a predefined voltage satisfies a threshold.

13. The method of claim 8, wherein communicating with the second NFC device over the channel comprises entering a receive mode to receive a signal from the second NFC device.

14. The method of claim 8, wherein communicating with the second NFC device over the channel comprises:
    listening to the channel to determine whether the channel is idle;
    determining that the channel is idle; and
    in response to determining that the channel is idle, transmitting a packet to the second NFC device over the channel.

15. A near-field communications (NFC) device, comprising:
    an NFC antenna;
    a transmitter to modulate a load, coupled to the NFC antenna, to signal its presence to other NFC devices without using a carrier signal;
    a receiver to receive a waveform from another NFC device via the NFC antenna while the transmitter modulates the load; and
    a controller to initiate a first portion of a protocol for communicating with the other NFC device in response to the receiver receiving the waveform while the transmitter modulates the load.

16. The NFC device of claim 15, wherein:
    the load comprises a switchable resistor; and
    the transmitter is to repetitively switch the resistor into and out of a signal path.

17. The NFC device of claim 15, wherein, to initiate the first portion of the protocol, the controller is to instruct the receiver to listen to an NFC channel and to instruct the transmitter to transmit a packet to the other NFC device over the channel in response to a determination that the channel is idle.

18. The NFC device of claim 15, wherein:
    the transmitter is to modulate the load during a first mode and to transmit a waveform during a second mode;
    the receiver comprises a detector to detect load modulation by the other NFC device; and the controller is to initiate a second portion of the protocol in response to the detector detecting the load modulation by the other NFC device.

19. The NFC device of claim 18, wherein the transmitter is to transmit an oscillating signal during the second mode.

20. The NFC device of claim 18, wherein, to initiate the second portion of the protocol, the controller is to activate the receiver, wherein upon activation the receiver is configured to receive a signal from the other NFC device.

21. The NFC device of claim 15, wherein the controller comprises one or more processors and memory storing instructions that, when executed by the one or more processors, cause the controller to initiate the first portion of the protocol in response to the receiver receiving the waveform.

22. The NFC device of claim 21, wherein:
the transmitter is to modulate the load during a first mode and to transmit a waveform during a second mode;
the receiver comprises a detector to detect load modulation by the other NFC device; and
the memory further stores instructions that, when executed by the one or more processors, cause the controller to initiate a second portion of the protocol in response to the detector detecting the load modulation by the other NFC device.

23. A non-transitory computer-readable medium storing instructions that, when executed by one or more processors of a first near-field communications (NFC) device, cause the first NFC device to perform operations comprising:
first, modulating a load in a transceiver of the first NFC device to signal its presence to other NFC devices without using a carrier signal;
then, while still modulating the load, detecting a waveform transmitted on an NFC channel by a second NFC device; and
in response to detecting the waveform while modulating the load, communicating with the second NFC device over the channel.

24. The non-transitory computer-readable medium of claim 23, wherein execution of the instructions for modulating the load causes the first NFC device to repetitively vary the load.

25. The non-transitory computer-readable medium of claim 24, wherein the load comprises a resistor in a transmitter of the first NFC device.

26. The non-transitory computer-readable medium of claim 25, wherein execution of the instructions for repetitively varying the load causes the first NFC device to repetitively switch the resistor in and out of a signal path.

27. The non-transitory computer-readable medium of claim 23, wherein execution of the instructions for detecting the waveform causes the first NFC device to detect an oscillating signal.

28. The non-transitory computer-readable medium of claim 23, wherein execution of the instructions for communicating with the second NFC device causes the first NFC device to perform operations further comprising:
listening to the channel to determine whether the channel is idle;
determining that the channel is idle; and
in response to determining that the channel is idle, transmitting a packet to the second NFC device over the channel.

29. The non-transitory computer-readable medium of claim 23, wherein execution of the instructions for communicating with the second NFC device causes the first NFC device to enter a receive mode to receive a signal from the second NFC device.

30. The non-transitory computer-readable medium of claim 23, wherein the load is modulated during a whisper mode.

* * * * *